United States Patent [19]

Yoon et al.

[11] Patent Number: 4,936,645
[45] Date of Patent: Jun. 26, 1990

[54] WAVEGUIDE ELECTROOPTIC LIGHT MODULATOR WITH LOW OPTICAL LOSS

[75] Inventors: Hyun-Nam Yoon, New Providence; Chia C. Teng, Piscataway, both of N.J.

[73] Assignee: Hoechst Celanese Corp., Somerville, N.J.

[21] Appl. No.: 398,020

[22] Filed: Aug. 24, 1989

[51] Int. Cl.[5] .......................... G02B 6/10; G02B 6/02; G02B 6/26
[52] U.S. Cl. ......................... 350/96.14; 350/96.15; 350/96.12
[58] Field of Search .............. 350/96.11, 96.12, 96.13, 350/96.14, 96.15, 96.29

[56] References Cited

PUBLICATIONS

"Optical waveguides by diffusion in II-VI compounds" by Hall et al., Appl. Phys. Lett. 21 (7), pp. 325-327, Oct. 1, 1972.
"Phase Matching in Second-Harmonic Generation Using Artificial Periodic Structures" by Bey et al., IEEE J. of Quantum Electronics, QE-9(1), Jan. 1973.
"Theory of Phase and Amplitude Bunching in Traveling Wave Interactions", By Shiren et al., Appl. Phys. Lett., vol. 22, No. 10, 15 May 1973.
"Guided-Wave Devices for Optical Communication" by Alferness, IEEE J. of Quantum Electronics, vol. QE-17, No. 6, Jun. 1981.
"Multigigahertz Lumped-Element Electrooptic Modulators", by Becker, IEEE J. of Quantum Electronics, vol. QE-21, No. 8, Aug. 1985.
"Generation of 22 mW of 532-nm radiation by frequency doubling in Ti: MgO: $LiNoO_3$ waveguides", by Fejer et al., Optics Letters/vol. No. 4, Apr. 1986.
"Phase matching by periodic variation of nonlinear coefficients", by Yacoby et al., by J. Appl. Phys., vol. 44, No. 7, Jul. 1973.
"Second harmonic generation in poled polymer films", by Singer et al., Appl. Phys. Letter 49(5), 4 Aug. 1986.

Primary Examiner—William L. Sikes
Assistant Examiner—Akm E. Ullah
Attorney, Agent, or Firm—DePaoli & O'Brien

[57] ABSTRACT

In one embodiment this invention provides a thin film waveguide electrooptic light modulator which consists of (1) a laminated assembly of a waveguiding thin film of an organic polymer which exhibits second order nonlinear optical response, and upper and lower organic polymer blend cladding layers, each of which has a lower index of refraction between about 0.002-0.02 lower than the waveguiding thin film and which exhibits second order nonlinear optical response; and (2) electrodes which are positioned to apply an electric field to the laminated assembly.

18 Claims, 2 Drawing Sheets

POLARIZATION-INSENSITIVE MACH-ZEHNDER MODULATOR

⊙ TE mode
† TM mode

WAVEGUIDE ELECTROOPTIC LIGHT MODULATOR WITH LOW OPTICAL LOSS

BACKGROUND OF THE INVENTION

Electrooptic light modulators utilizing bulk inorganic crystals are well-known and widely utilized. Waveguide electrooptic light modulators are a more recent development, and are described in literature such as Applied Physics Letters, 21, No. 7, 325 (1972); 22, No. 10, 540 (1973); and U.S. Pat. Nos. 3,586,872; 3,619,795; 3,624,406; 3,806,223; 3,810,688; 3,874,782; 3,923,374; 3,947,087; 3,990,775; and references cited therein.

One of the principal advantages of an optical waveguide configuration as contrasted to bulk crystals is that much lower electrical potentials may be used with the optical waveguide configuration, and much lower capacitive values and faster modulation rates also may be realized. Both of these operative characteristics are necessary to achieve high speed operation of such electrooptic modulators.

A thin film waveguide electrooptic modulator can operate employing one of several modulating mechanisms, e.g., phase retardation, Mach-Zehnder interferometry, directional coupling, or rotation of the optical polarization. Illustrative of waveguide designs are linear waveguide channels, such as those with a directional coupler configuration or a cross-bar configuration.

The guided-wave Mach-Zehnder interferometric modulator is a well-known optical device which has been described in literature such as "Multigigahertz-Lumped-Element Electrooptic Modulator," by R. A. Becker, IEEE Journal of Quantum Electronics, Vol. QE-21, No. 8, Aug. 1985, pp. 1144–1146; and "Guided-Wave Devices for Optical Communication," by R. C. Alferness, IEEE Journal of Quantum Electronics, Vol. QE-17, No. 6, June 1981, pp. 946–959.

The interferometric modulator consists of a single input waveguide, an input branching region for splitting the input light power into two substantially equal branch waveguides, an output branching region for recombining the propagating light power in the two branch waveguides, and an output waveguide. By effecting a phase shift in one branch waveguide relative to the other, the combined output light power is between zero and the input power level, depending upon the magnitude of the phase shift. Such phase shifts are effected by means of electrodes disposed on the substrate of the optical waveguide proximate to one or both of the branch waveguides. When a voltage is applied, the electrooptic effect changes the refractive index of the proximate branch waveguide changing the optical path length, thereby effecting a phase change in the branch. By keeping the branch waveguides sufficiently apart to prevent optical coupling between the branches which would degrade performance, voltage variations are linearly transformed into the phase changes and thus into amplitude variations in the light output power level. By modulating the electrode voltage with an analog or digital information signal, the output light power is similarly modulated and can be coupled onto a fiber waveguide for transmission.

There are other factors of critical concern in the design and fabrication of optical waveguides. The polarization properties of integrated optical switches and modulators are of great importance in determining the utility of these devices of an optical data transfer system employing fiber transmission lines. In particular, these devices must perform efficient and complete switching of light, without regard to its state of polarization. This requirement arises because linearly polarized light coupled into single-mode circular fibers suffers a rapid conversion to other polarization states. Light coupled from a fiber therefore usually possesses an unknown elliptical polarization, and both transverse electric (TE) and transverse magnetic (TM) modes will be excited in the integrated optical circuit. Any optical modulator must act in identical fashion upon each of the constituent polarizations in order to achieve an acceptable low level of interchannel crosstalk.

Polarization-independent optical switches and modulators are described in U.S. Pat. Nos. 4,243,295; 4,291,939; 4,514,046; 4,674,829; 4,756,588; and references cited therein. The known polarization-independent waveguide devices all are constructed with inorganic waveguide channels such as crystalline $LiNbO_3$, $LiTaO_3$, GaAs or CdSe.

Another important factor in the design and fabrication of optical waveguide devices is optical loss. In an optical data transfer system employing fiber transmission lines low optical loss properties of integrated optical switches and modulators are a critical requirement in conserving optical signal intensity and thereby enhancing the utility of the system. It is essential that these devices receive the optical signal transmitted by a fiber with a minimum of optical signal loss, and that the optical signal loss by scattering in the waveguide is minimized.

For these devices to receive the optical signal from the fiber transmission or to transfer the modulated optical signal to the fiber with a minimum of optical loss, the spatial mode profile of the optical signal in the waveguide of these devices must overlap as closely as possible with the mode profile in the optical fiber. This necessitates that the lateral dimensions of waveguides closely approximate the diameter of core region of the optical fiber.

As a further aspect of efficient electrooptic modulation, the waveguide of an electrooptic modulator must support only a single optical mode. This implies that the refractive index of cladding layers must be controlled precisely at a slightly lower value than that of the waveguide medium.

A detailed treatise on efficient coupling of optical signals between waveguiding media is provided in literature such as "Guided-Wave Optoelectronics", T. Tamir (ed.), Springer-Verlag, Chapter 3, pp 87–144 (1988).

For a low voltage operating electrooptic modulator, highly responsive nonlinear optical media are required. $LiNbO_3$ has been an important inorganic species for waveguide electrooptic modulator construction. However, there are certain inherent disadvantages in the use of $LiNbO_3$ or other inorganic crystal in an electrooptic modulator, such as the limitation of the input optical power due to the inherent photorefractive effect, and the high fabrication cost for a $LiNbO_3$ high quality crystal.

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington D.C. 1983.

Organic nonlinear optical medium in the form of transparent thin substrates are described in U.S. Pat. Nos. 4,536,450; 4,605,869; 4,607,095; 4,615,962; and 4,624,872.

The above recited publications are incorporated herein by reference.

There is continuing research effort to develop new nonlinear optical organic media and electrooptic devices adapted for laser modulation, information control in optical circuitry, and the like. The potential utility of organic materials with large second order and third order nonlinearities for very high frequency application contrasts with the bandwidth limitations of conventional inorganic electrooptic materials.

Accordingly, it is an object of this invention to provide a novel waveguide medium for a low voltage operating electrooptic light modulator.

It is another object of this invention to provide an electrooptical light modulator which contains an organic nonlinear optical waveguide channel configuration, and which exhibits low optical loss properties.

It is a further object of this invention to provide a polarization-insensitive polymeric thin film waveguide electrooptic light amplitude modulator.

Other objects and advantages of the present invention shall become apparent from the accompanying description and drawings.

DESCRIPTION OF THE INVENTION

One or more objects of the present invention are accomplished by the provision of a waveguide medium for optical modulation of light which comprises:
a. a waveguiding organic thin film component which exhibits second order nonlinear optical susceptibility $\chi^{(2)}$; and
b. an upper cladding layer and a lower cladding layer, each of which consists of a transparent organic polymer blend medium which has a lower index of refraction than the waveguiding thin film component, and which exhibits second order nonlinear optical susceptibility $\chi^{(2)}$.

In another embodiment this invention provides a thin film waveguide electrooptic light modulator which consists of a laminated assembly of substrates comprising:
a. a waveguiding thin film of an organic polymer component having a thickness of about 3–10 microns, which exhibits second order nonlinear optical susceptibility $\chi^{(2)}$;
b. upper and lower cladding layers, each of which consists of an organic polymer blend medium which has an index of refraction between about 0.002–0.02 lower than the waveguiding thin film component, and which exhibits second order nonlinear optical susceptibility $\chi^{(2)}$; and
c. electrodes which are positioned to apply an electric field to the assembly of waveguiding thin film and cladding layers.

For many applications a thin film waveguide has a single mode channel structure, such as a single channel phase modulator, two channel directional coupling, cross-bar switching or Mach-Zehnder modulator configuration.

The term "polymer blend" as employed herein refers to a mixture of two or more components, at least one of which is a polymer and at least one of which exhibits second order nonlinear optical response. A polymer blend cladding layer is optically transparent and light transmitting with respect to incident fundamental light frequencies and harmonic light frequencies.

In a further embodiment this invention provides an interferometric waveguide electrooptic light modulator comprising:
a. first and second waveguide channels diverging from a common light input to form co-extensive channels of substantially identical optical length, and reconverging to a common light output, wherein the waveguide channels are composed of a laminated assembly of organic substrates comprising
  (1) a waveguiding organic thin film component which exhibits second order nonlinear optical susceptibility $\chi^{(2)}$, and
  (2) an upper organic polymer blend cladding layer and a lower organic polymer blend cladding layer, each of which has a lower index of refraction than the waveguiding thin film component, and which exhibits second order nonlinear optical susceptibility $\chi^{(2)}$, and the waveguide channels have thickness and width dimensions of about 3–10 microns respectively; and
b. a set of spaced electrodes positioned in proximity along a channel to facilitate the application of an electric field to the channel organic medium, wherein the organic medium zone between the spaced electrodes has a noncentrosymmetric molecular orientation which is parallel to the direction of an applied electric field.

An essential aspect of the present invention embodiments is the integrated waveguiding function of the assembly of thin film component and upper and lower cladding layers, all of which are adapted to modulate and transmit polarized electromagnetic radiation.

The waveguiding thin film component modulates the major portion of the light energy being transmitted, because it has a higher index of refraction than the two optically transparent organic polymer blend cladding layers which are contiguous with the thin film. Both cladding layers exhibit second order nonlinear optical response, so that light which reflects from the thin film waveguide medium into the cladding layers is modulated and transmitted concomitantly with the thin film light transmission.

In order to exhibit second order nonlinear optical response, the thin film and cladding layers each has a macroscopic noncentrosymmetric array of organic molecules. As described more fully hereinbelow, the required noncentrosymmetric molecular orientation can be achieved by applying an electric field to the assembly of thin film and cladding layers while the assembly is in a heated state to facilitate induced orientation of the mobile organic molecules by the applied electric field.

Because each of the thin film and cladding layers is capable of modulating light, all of the incident light energy is modulated and transmitted, thereby permitting a lower electrical voltage for a desired degree of modulation.

In a fiber optic data transmission system having one or more integrated optical waveguide devices, efficient data transmission requires that coupling loss and propagation loss of an optical signal be minimized. Optical signal loss can be reduced by conforming the fiber diameter and waveguide dimensions. However, since all modulation schemes for integrated optical modulators are based on the single mode nature of the waveguiding medium of the devices, the waveguide dimensions cannot be arbitrarily matched to the fiber diameter without accurately controlling the refractive index difference between the waveguiding medium and the cladding layers. As presently practiced, a typical single mode fiber diameter is about 5–10 microns. To develop a single mode waveguide channel with a low coupling loss with a single mode optical fiber, it is necessary to control the refractive index difference between the cladding layers and the waveguiding medium within a range of about 0.002–0.02.

An essential aspect of the present invention embodiments is the integrated waveguiding function of the assembly of thin film component and upper and lower cladding layers, all of which are adapted to modulate and transmit polarized electromagnetic radiation and exhibit a superior optical loss performance.

Figure 1:
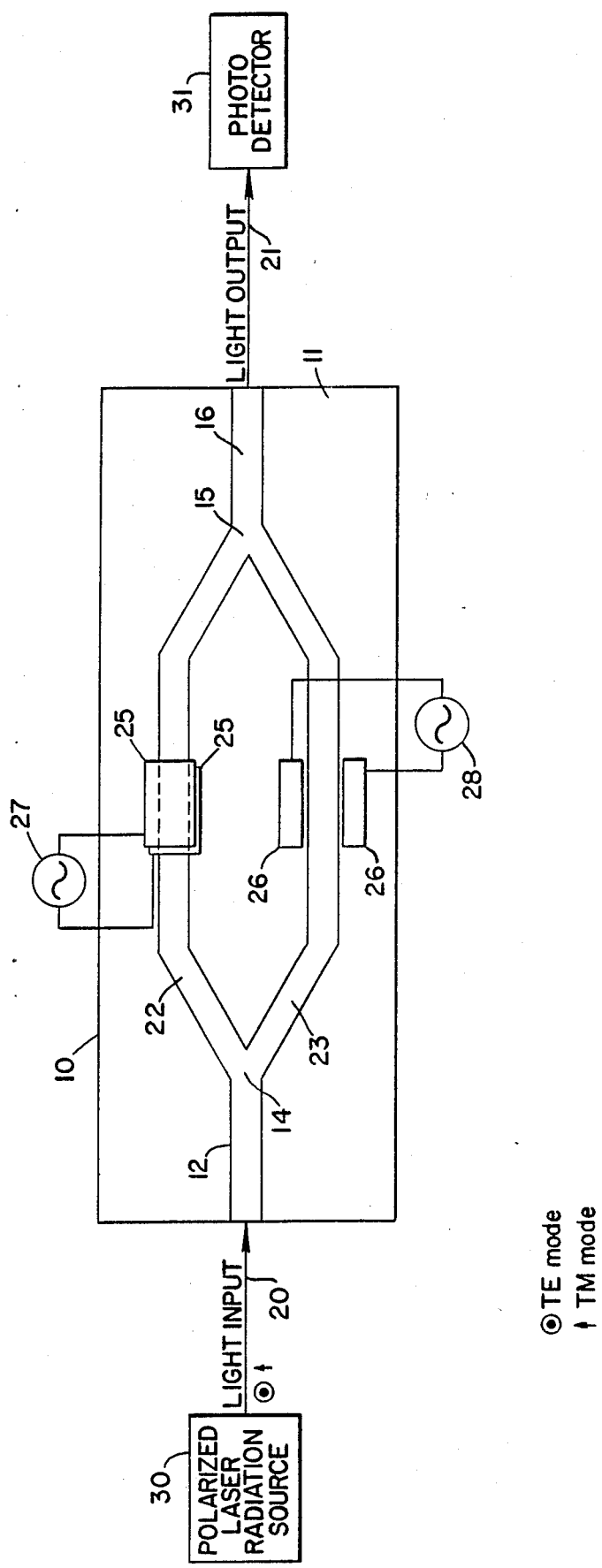
FIG. 1 is a schematic drawing of a polarization-insensitive optical Mach-Zehnder interferometric electrooptic light modulator in accordance with the present invention.

In a present invention polarization-insensitive interferometric waveguide device as represented in FIG. 1, the propagation constant of each of the waveguide channels is changed by means of a vertical electric field and a horizontal electric field applied separately to the respective waveguide channels. The difference in the propagation speed of light in the two channels produces an electrically controlled phase shift. The output light intensity varies with the phase shift, and therefore is modulated by the applied voltage through the electrooptical effect.

The polarization-insensitive character of the light modulation is achieved by balancing the voltages of the two parallel sets of electrodes separately situated on the respective waveguide channels, so as to effect equal phase modulation of the TE and TM modes with the horizontal and vertical electric fields.

The applied voltage can be AC or DC, and typically will vary between about 0–400 volts, and the frequency of the applied field will vary between DC and gigahertz region.

Referring to FIG. 1 interferometer 10 consists of a transparent nonlinear optical polymeric film component 11 on a supporting substrate. Film 11 has an incorporated geometry of an input optical waveguide 12 that Y branches at 14 to split a randomly polarized optical power light input 20 between light path channel 22 and light path channel 23. The light propagating along channels 22 and 23 reconverges through Y branches at 15, and exits through waveguide 16 as light output 21. The polymeric medium of the waveguide channels has a higher index of refraction than the polymeric film which is contiguous with the waveguide channels, and also higher than the nonlinear optically responsive cladding layers which are utilized as protective layers.

Electrodes 25 are connected to voltage source 27, and are activated to apply a vertical electric field to channel 22. Electrodes 26 are connected to voltage source 28, and are activated to apply a horizontal electric field to channel 23. The polymeric medium between electrodes 25 in channel 22 has a stable molecular orientation which is parallel to the vertical electric field applied by electrodes 25. The polymeric medium between electrodes 26 in channel 23 has a stable molecular orientation which is parallel to the horizontal electric field applied by electrodes 26.

In an operating mode, device 10 is utilized in combination with laser radiation source 30 of arbitrary polarization which provides input laser beam 20; and with photodetector 31 which functions to convert output signal 21 to a reconstructed electrical signal.

The input coherent electromagnetic radiation preferably is a laser beam such as a semiconductor 800–1500 nm output.

Figure 3:
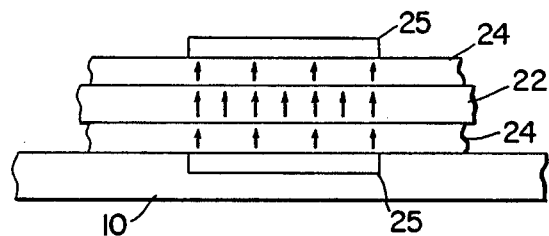

The organic film-supporting substrate illustrated in FIG. 3 can be constructed of any convenient non-conducting medium such a plastic, glass or silicon.

Figure 2:
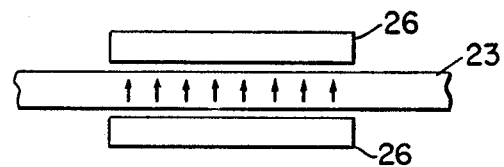
FIG. 2 and FIG. 3 are schematic plan views of sections of the FIG. 1 device, and indicate noncentrosymmetric orientation of organic molecules parallel to the direction of an applied electric field.

Referring to FIG. 2, channel 23 has a noncentrosymmetric orientation of organic molecules which is parallel to the direction of an applied field by electrodes 26, and the orientation is horizontal to the plane of the waveguide device.

In FIG. 3, substrate 10 is shown as a support layer for the laminated assembly of waveguide layers. Channel 22 and cladding layers 24 have a noncentrosymmetric orientation of organic molecules which is parallel to the direction of an applied electric field by electrodes 25, and the orientation is vertical to the plane of the waveguide device.

The thin film organic waveguiding medium and the cladding layers of the invention electrooptic device are transparent, and either isotropic or liquid crystalline in physical properties, and each exhibits nonlinear optical response.

A typical thin film organic medium or cladding layer comprises a blend of a polymer host and a guest component. The nonlinear optical properties of the thin film and cladding layers can be controlled by the guest component alone, or both the host and the guest components can exhibit nonlinear optical susceptibility.

Illustrative of suitable host polymers are poly(methyl methacrylate), cellulose acetate, polysiloxane, polyacrylamide, polyacrylonitrile, polycarbonate, nylon, polyethylene, polysulfone, polystyrene, polyurethane, and the like.

Illustrative of suitable guest compounds are 4-nitroaniline, 2-methyl-4-nitroaniline, 4-N,N-dimethylamino-4'-nitrostilbene (DANS), and the like.

Other suitable nonlinear optically active guest compounds are illustrated by quinodimethane structures corresponding to the formulae:

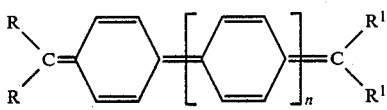

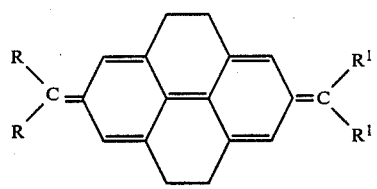

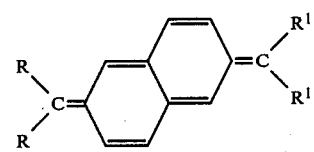

where n is an integer with a value between about 0–3; R and R¹ are substituents selected from hydrogen and aliphatic, alicyclic and aromatic groups containing between about 1–20 carbon atoms, and at least one of the R substituents is an electron-donating group, and at least one of the R¹ substituents is an electron-withdrawing group.

Illustrative of nonlinear optically active quinodimethane species are 7,7-di(n-hexyldecylamino)8,8-dicyanoquinodimethane; 13,13-diamino-14,14-dicyanodiphenoquinodimethane; 13,13-di(dimethylamino)-14,14-dicyanodiphenoquinodimethane; 13,13-di(n-hexadecylamino)-14,14-dicyanodiphenoquinodimethane; 13,13-ethylenediamino-14,14-dicyanodiphenoquinodimethane; 13,13-di(dimethylamino)-14,14-dicyano4,5,9,10-tetrahydropyrenoquinodimethane; 13,13-di(n-hexadecylamino)-14,14-dicyano-4,5,9,10tetrahydropyrenoquinodimethane; and the like.

The synthesis of quinodimethane compounds as listed above is described in U.S. Pat. No. 4,640,800 and U.S. Pat. No. 4,707,305; incorporated herein by reference.

The term "electron-donating" as employed herein refers to organic substituents which contribute electron density to the $\pi$-electron system when the conjugated electronic structure is polarized by the input of electromagnetic energy, e.g., amino, oxy or thio.

The term "electron-withdrawing" as employed herein refers to electronegative organic substituents which attract electron density from the $\pi$-electron system when the conjugated electron structure is polarized by the input of electromagnetic energy, e.g., nitro, cyano, trifluoromethyl, tricyanovinyl or triflone.

A particular host polymer is selected for ease of fabrication, optical properties, and compatibility with the organic guest component. The guest component typically will constitute between about 5–60 weight percent of a thin film waveguide or cladding guest/host medium.

A polymer which exhibits nonlinear optical response can be employed as a host component, or it can be utilized in a blend with one or more other polymer components. This type of organic component is illustrated by thermoplastic polymers which are characterized by a recurring monomeric unit corresponding to the formula:

where P' is a polymer main chain unit, S' is a flexible spacer group having a linear chain length of between about 1–20 atoms, M' is a pendant group which exhibits a second order nonlinear optical susceptibility $\beta$, and where the pendant groups comprise at least about 10 weight percent of the polymer, and the polymer has a glass transition temperature above about 40° C.

Thermoplastic side chain polymers corresponding to the above formula can be either isotropic or liquid crystalline in physical properties. Suitable side chain polymers are described in U.S. Pat. No. 4,694,066. Illustrative of side chain polymers are poly[6-(4-nitrobiphenyloxy)hexyl methacrylate], poly[(N-4-nitrophenyl-4-piperidyl) methacrylate], and stilbene-containing polymers such as:

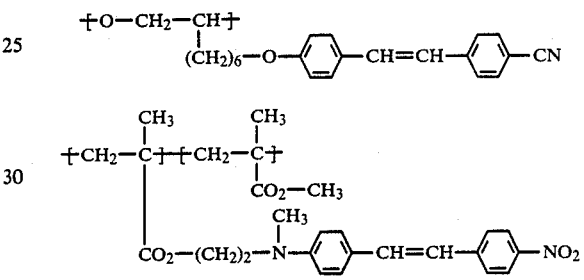

A present invention electrooptic device has waveguide thin film and cladding optical paths which have an external field-induced alignment of molecular dipoles, such as nonlinear optically active guest molecules, or nonlinear optically active pendant side chains of polymers of the type described above.

Poling of the thin film and cladding layers can be accomplished conveniently by heating the assembly near or above the melting point or glass transition temperature of the organic media, then applying a DC electric field (e.g., 50–300 V/$\mu$m) to the organic media to align molecular dipoles in a uniaxial orientation. The assembly then is cooled while the organic strata are still under the influence of the applied DC electric field. In this manner a stable and permanent molecular orientation is immobilized in a rigid structure, such as between the pairs of electrodes shown in FIG. 2 and FIG. 3.

Electrode pairs 25 and 25 in FIG. 1, FIG. 2 and FIG. 3 can be a strip coating of a suitable conducting material such as aluminum, silver, gold, copper, indium-tin oxide, indium titanate, and the like, and are connected to DC or AC power sources 27 and 28.

The thin film waveguide layer 22 and cladding layers 24 as shown in FIG. 3 can be composited with supporting substrate 10 and the electrodes by conventional fabricating techniques such as spin coating, spraying, Langmuir-Blodgett deposition, sputtering, and the like, as appropriate for the respective materials.

The following example is further illustrative of the present invention. The device components are presented as being typical, and various modifications in design and operation can be derived in view of the foregoing disclosure within the scope of the invention.

EXAMPLE

This Example illustrates the construction and operation of a polarization-insensitive waveguide electrooptic modulator in accordance with the present invention as represented in FIG. 1.

A commercially available silicon dioxide-coated silicon wafer is placed in a Varian electron beam vacuum deposition system. A 0.1 μm layer of 99.999% purity aluminum is deposited on the wafer.

AZ-1518 positive photoresist (Hoechst) is spin-coated on the aluminum-coated wafer with a Solitec model 5100 coater. A 1.5 μm photoresist coating is achieved by spinning at 5000 rpm for 30 seconds. The photoresist coating is dried in a vacuum oven at 90° C. for 30 minutes.

The photoresist coating is patterned in the form of lower electrode 25 in FIG. 1 by placing the wafer in contact with a mask of the desired configuration in a Karl Suss model MJB3 mask aligner, and exposing the marked coating to 405 μm radiation (120 mJ/cm$^2$).

The mask is removed, and the patterned photoresist is developed with AZ-400k Developer in water (1:1) over a period of 45 seconds, and the developing cycle is terminated by washing with deionized water.

The photoresist-coating of the wafer is baked in a vacuum oven at 120° C. for 30 minutes. The exposed aluminum pattern is etched with type A etchant at 50° C. for 20 seconds, and the etched surface is rinsed with deionized water.

The aluminum electrode surface of the wafer is covered with a 8.0 μm lower organic cladding layer of a 25% by weight solution in cyclohexanone of a mixture of two copolymers of methyl methacrylate/4-(N,N'-methacroylethoxy-methyl-amino)4'-nitrostilbene with the copolymer composition of 50/50 and 65/35 in the ratio of 3:1, respectively, by spin-coating at 1000 rpm for 20 seconds, and the cladding layer is dried in a vacuum oven at 160° C. for one hour. The organic polymers have a weight average molecular weight of about 40,000, and the cladding layer has a refractive index of 1.623.

A photoresist layer of AZ-1518 is spin-coated on the cladding layer at 4000 rpm, and the layer is exposed to 405 μm radiation (120 mJ/cm$^2$). A 0.2 μm layer of aluminum is deposited on the photoresist layer. The aluminum layer is coated with a photoresist layer, and the layer is patterned in the form of a Mach-Zehnder interferometric waveguide as represented in FIG. 1. The waveguide width is 5 μm. The Y junction channels separate and recombine at a full angle of 1.2 degrees.

The upper surface of the waveguide structure is exposed to reactive ion etching for 10 minutes under oxygen plasma conditions as previously described, to develop a waveguide channel in the form of a Mach-Zehnder interferometric waveguide. The etching cycles also remove the photoresist coating from the aluminum surface.

The aluminum and lower photoresist layers are removed by immersion of the waveguide structure in AZ-400k developer for one minute.

A nonlinear optically active thin film is spin-coated on the cladding layer Mach-Zehnder waveguide channel pattern. The spin-coating medium is a 20% by weight solution of a copolymer (50/50) of methylmethacrylate/4-(N,N'-methacroylethoxy-methylamino)-4'-nitrostilbene in cyclohexanone. At a spin-coating speed of 2000 rpm, the waveguiding layer has a thickness of about two microns outside of the channel. The two layer structure is dried in a vacuum oven at 160° C. for one hour. The refractive index of the waveguiding layer is 1.630.

The dried multilayer channel waveguide is spin-coated with an upper cladding layer in the same manner as described above for the lower cladding layer, except that the layer thickness is 5 microns.

A 0.1 μm layer of aluminum is deposited on the upper organic cladding layer, and following the pattern procedures described above the upper electrode 25 and electrodes 26 in FIG. 1 are formed.

The waveguide structure is cleaved at opposite ends to provide two sharp faces to couple light in and out of the waveguiding thin film and cladding assembly.

The single mode character of the channel waveguide structure is confirmed by coupling a 1340 μm laser beam at one end and establishing that the far field pattern of the exiting beam is a single spot. The coupling loss at each end surface is about one dB.

Molecular orientation of the two polymeric waveguide assembly sections between the two sets of electrodes respectively is accomplished by application of applied electric fields by the sets of electrodes.

The fabricated waveguide device is placed in a Mettler hot stage, and the unit is raised to 140° C. at 1° C./min. A DC field of 70 V/μm and an AC voltage of 5 volts sine (10,000 t) is applied to one set of electrodes, and a variable DC voltage and an AC voltage of 5 volts sine (10,000 t) are applied to the other set of electrodes.

Objective lenses (10X) are employed to focus and couple 1.34 μm radiation (100 mW continuous wave) into the Mach-Zehnder waveguide. The output of the waveguide is passed through a 10X microscope objective, a polarization beam splitter, and then into two optical detectors. The detector signals are transmitted to two lock-in amplifiers.

Both amplifiers are tuned for a signal at 10,000 Herz, and the variable DC voltage to the first set of electrodes is adjusted until the signals in the two amplifiers are identical.

The waveguide unit is held at 140° C. for 20 minutes under the adjusted applied fields, and the applied fields are maintained while the waveguide unit is cooled to room temperature at 1° C./minute.

During operation of the waveguide, the effected light modulation is polarization-insensitive because the voltages applied to the two sets of electrodes are balanced to achieve equal phase modulation of the TE and TM modes of transmitted light.

What is claimed is:

1. A waveguide medium for optical modulation which comprises:
   a. a waveguiding organic thin film component which exhibits second order nonlinear optical susceptibility $\chi^{(2)}$; and
   b. an upper cladding layer and a lower cladding layer, each of which consists of a transparent organic polymer blend medium which exhibits second order nonlinear optical susceptibility $\chi^{(2)}$; wherein the waveguiding thin film component comprises an organic polymer with pendant side chains which exhibit second order nonlinear optical susceptibility $\beta$, and each cladding layer contains at least one polymer with pendant side chains which exhibit second order nonlinear optical susceptibilibility $\beta$, and each cladding layer has an index of refraction between about 0.002–0.02 lower than the waveguiding component.

2. A waveguide medium in accordance with claim 1 wherein the waveguiding thin film component comprises an organic polymeric host matrix, and an organic guest compound which exhibits second order nonlinear optical susceptibility $\beta$.

3. A waveguide medium in accordance with claim 1 wherein each of the cladding layers comprises a polymeric host matrix, and an organic guest compound which exhibits second order nonlinear optical susceptibility $\beta$.

4. A waveguide medium in accordance with claim 1 wherein each cladding layer contains at least two copolymers with pendant side chains which exhibit second order nonlinear optical susceptibility $\beta$, and the copolymers differ in the number of pendant side chains per molecule.

5. A thin film waveguide electrooptic light modulator which consists of a laminated assembly of substrates comprising:
   a. a waveguiding thin film of an organic polymer component having a thickness of about 4–10 microns, which exhibits second order nonlinear optical susceptibility $\chi^{(2)}$;
   b. upper and lower cladding layers, each of which consists of an organic polymer blend medium which has an index of refraction between about 0.002–0.02 lower than the waveguiding thin film component, and which exhibits second order nonlinear optical susceptibility $\chi^{(2)}$; and
   c. electrodes which are positioned to apply an electric field to the assembly of waveguiding thin film and cladding layers.

6. A thin film waveguide modulator in accordance with claim 5 wherein the thin film component has a channel phase modulator configuration with thickness and width dimensions of about 3–10 microns respectively.

7. A thin film waveguide modulator in accordance with claim 5 wherein the thin film component has an interferometric channel waveguide configuration.

8. A thin film waveguide modulator in accordance with claim 5 wherein the laminated assembly of substrates has a polarization-insensitive Mach-Zehnder interferometric waveguiding structure.

9. A thin film waveguide modulator in accordance with claim 5 wherein the thin film component has a two channel directional coupler configuration.

10. A thin film waveguide modulator in accordance with claim 5 wherein the thin film component has a two channel cross-bar switching configuration.

11. A thin film waveguide modulator in accordance with claim 5 wherein the waveguiding thin film component and the cladding layers each contain an organic polymer with pendant side chains which exhibit second order nonlinear optical susceptibility $\beta$, and wherein the thin film component and cladding layers have stable electric field-induced zones of noncentrosymmetric polymer molecular orientation.

12. A thin film waveguide modulator in accordance with claim 5 wherein the waveguiding thin film component and the cladding layers each contain at least one acrylic polymer with pendant side chains which contain a stilbene structure in conjugation with an electron-donating group and an electron-withdrawing group.

13. A thin film waveguide modulator in accordance with claim 5 wherein the waveguiding thin film component and the cladding layers each contain at least one acrylic copolymer with pendant side chains which have a 4-amino-4'-nitrostilbene structure.

14. A channel waveguide electrooptic phase modulator comprising:
   a. A single mode linear waveguide channel with thickness and width dimensions of about 3–10 microns respectively, which consists of a laminated assembly of substrates comprising:
      (1) a waveguiding thin film of an organic polymer component which exhibits second order nonlinear optical susceptibility $\chi^{(2)}$;
      (2) upper and lower cladding layers, each of which consists of an organic polymer blend medium which has an index of refraction between about 0.002–0.02 lower than the waveguiding thin film component, and which exhibits second order nonlinear optical susceptibility $\chi^{(2)}$; and
   b. electrodes which are positioned to apply an electric field to the waveguide channel.

15. An interferometric waveguide electrooptic modulator comprising:
   a. first and second single mode waveguide channels with thickness and width dimensions of about 3–10 microns respectively, diverging from a common light input to form co-extensive channels of substantially identical optical length, and reconverging to a common light output, wherein the waveguide channels are composed of a laminated assembly of organic substrates comprising:
      (1) a waveguiding organic thin film component which exhibits second order nonlinear optical susceptibility $\chi^{(2)}$;
      (2) an upper organic polymer blend polymer blend cladding layer and a lower organic polymer blend cladding layer, each of which has a lower index of refraction than the waveguiding thin film component, and which exhibits second order nonlinear optical susceptibility $\chi^{(2)}$; and
   b. a set of spaced electrodes positioned in proximity along a channel to facilitate the application of an electric field to the channel organic medium, wherein the organic medium zone between the spaced electrodes has a noncentrosymmetric molecular orientation which is parallel to the direction of an applied electric field.

16. A waveguide electrooptic modulator in accordance with claim 15 wherein the channel waveguiding thin film component and the cladding layers each contain at least one organic polymer with pendant side chains which exhibit second order nonlinear optical susceptibility $\beta$, and each cladding layer has an index of refraction between about 0.002–0.02 lower than the waveguiding component.

17. A channel waveguide electrooptic modulator having a directional coupling configuration which comprises:
   a. first and second single mode waveguide channels in a parallel and co-extensive proximity with thickness and width dimensions of about 3–10 microns respectively, wherein each channel consists of laminated assembly of substrates comprising:
      (1) a waveguiding thin film of an organic polymer component which exhibits second order nonlinear optical susceptibility $\chi^{(2)}$;
      (2) upper and lower cladding layers, each of which consists of an organic polymer blend medium which has an index of refraction between about 0.002–0.02 lower than the waveguiding thin film component, and which exhibits second order nonlinear optical susceptibility $\chi^{(2)}$; and b. electrodes which are positioned to apply an electric field to the waveguide channels.

18. A channel waveguide electrooptic modulator having a cross-bar switching configuration which comprises:

a. first and second single mode waveguide channels with thickness and width dimensions of about 3–10 microns which intersect to form a junction, wherein each channel consists of a laminated assembly of substrates comprising:
  (1) a waveguiding thin film of an organic polymer component which exhibits second order nonlinear optical susceptibility $\chi^{(2)}$;
  (2) upper and lower cladding layers, each of which consists of an organic polymer blend medium which has an index of refraction between about 0.002–0.02 lower than the waveguiding thin film component, and which exhibits second order nonlinear optical susceptibility $\chi^{(2)}$; and b. electrodes which are positioned to apply an electric field to the channel junction.

* * * * *